United States Patent
Kariya et al.

(10) Patent No.: US 10,129,899 B2
(45) Date of Patent: Nov. 13, 2018

(54) NETWORK APPARATUS

(71) Applicant: APRESIA Systems, Ltd., Tokyo (JP)

(72) Inventors: Kazutoshi Kariya, Tsuchiura (JP); Kenji Aoshima, Tsuchiura (JP)

(73) Assignee: APRESIA SYSTEMS, LTD., Tokyo (JP)

(*) Notice: Subject to any disclaimer, the term of this patent is extended or adjusted under 35 U.S.C. 154(b) by 11 days.

(21) Appl. No.: 15/479,040

(22) Filed: Apr. 4, 2017

(65) Prior Publication Data

US 2017/0295583 A1    Oct. 12, 2017

(30) Foreign Application Priority Data

Apr. 7, 2016  (JP) .................................. 2016-077209

(51) Int. Cl.
  *H04W 72/08*    (2009.01)
  *H04W 72/04*    (2009.01)

(52) U.S. Cl.
  CPC ..... *H04W 72/085* (2013.01); *H04W 72/0446* (2013.01); *H04W 72/0486* (2013.01)

(58) Field of Classification Search
  None
  See application file for complete search history.

(56) References Cited

U.S. PATENT DOCUMENTS

| | | | |
|---|---|---|---|
| 5,390,173 A * | 2/1995 | Spinney ................. | H04L 12/46 370/401 |
| 7,539,489 B1 * | 5/2009 | Alexander ............ | H04W 24/06 370/241 |
| 9,413,547 B2 * | 8/2016 | Hiscock ................. | H04L 12/24 |
| 2015/0029841 A1 | 1/2015 | Takayanagi et al. | |
| 2017/0171050 A1 * | 6/2017 | Puzis ................. | H04L 43/0876 |

FOREIGN PATENT DOCUMENTS

JP    2015026945 A    2/2015

* cited by examiner

*Primary Examiner* — Hong Cho
(74) *Attorney, Agent, or Firm* — Nixon Peabody LLP; Eduardo J. Quiñones

(57) ABSTRACT

A traffic amount measuring unit measures the traffic amount of frames received in each of cycles, and outputs the measured traffic amount for each cycle. A plurality of frequency counters are provided so as to correspond to a plurality of ranges, and retain frequencies of each of the plurality of ranges, respectively. A frequency counter updating unit determines in which of the plurality of ranges the traffic amount output for each cycle is included, and updates the frequency of the frequency counter corresponding to the range obtained by the determination result.

7 Claims, 6 Drawing Sheets

NETWORK APPARATUS

CROSS-REFERENCE TO RELATED APPLICATION

The present application claims priority from Japanese Patent Application No. 2016-077209 filed on Apr. 7, 2016, the content of which is hereby incorporated by reference into this application.

TECHNICAL FIELD OF THE INVENTION

The present invention relates to a network apparatus, for example, a network apparatus having a frame monitoring function.

BACKGROUND OF THE INVENTION

For example, Japanese Patent Application Laid-Open No. 2015-26945 (Patent Document 1) describes a method in which the number of received packets containing predetermined information is counted for each cycle with a predetermined time width in the LTE system and occurrence of a microburst is determined when a count value of one cycle exceeds a threshold.

SUMMARY OF THE INVENTION

In a network system in which a frame is relayed via a switch apparatus, a phenomenon called microburst in which a traffic amount suddenly increases within a short period (for example, μs to ms order) occurs in some cases. For example, if the microburst occurs due to a certain customer in the situation where a plurality of customers are conducting communications while sharing the same resource (the same port or the like) in a switch apparatus, the microburst may affect the other customers. Therefore, it is desired that a switch apparatus detects the occurrence of the microburst.

For the detection of the microburst, for example, a method of determining the occurrence of the microburst by monitoring the traffic amount (for example, the number of frames for each cycle) and comparing the traffic amount with a threshold is conceivable as described in Patent Document 1. In this case, it is important to appropriately set the threshold, but in fact, it is not easy to determine the appropriate threshold. To be more specific, as a simple method of setting the threshold, a method in which a threshold for each customer is uniformly set on the basis of the physical band of a port and the number of customers has been known. However, the threshold set by such a simple method is not always appropriate in an actual operation.

Namely, it is assumed in practice that the traffic tendency differs between the customer who mainly uses communication of streaming data and the customer who mainly accesses the Web. In consideration of such a reality, the threshold optimized for each customer is more suitably used for actual operation than the threshold determined uniformly. For this purpose, however, it is necessary to find a technique capable of visualizing the traffic tendency.

The present invention has been made in consideration of such a circumstance, and an object of the present invention is to provide a network apparatus capable of visualizing a traffic tendency.

The above and other objects and novel characteristics of the present invention will be apparent from the description of the present specification and the accompanying drawings.

The following is a brief description of an outline of the typical embodiment of the invention disclosed in the present application.

A network apparatus according to the present embodiment includes: a port that receives a frame; a traffic amount measuring unit; a plurality of frequency counters; and a frequency counter updating unit. The traffic amount measuring unit measures a traffic amount of the frames received in each of cycles and outputs the measured traffic amount for each of the cycles. The plurality of frequency counters are provided so as to correspond to a plurality of ranges and retain frequencies of the plurality of ranges respectively. The frequency counter updating unit determines in which of the plurality of ranges the traffic amount output for each of the cycles is included, and updates the frequency of the frequency counter corresponding to the range obtained by the determination result.

The effect obtained by typical embodiments of the invention disclosed in the present application will be briefly described below. That is, it is possible to visualize the traffic tendency.

BRIEF DESCRIPTIONS OF THE DRAWINGS

DESCRIPTIONS OF THE PREFERRED EMBODIMENTS

Figure 1:
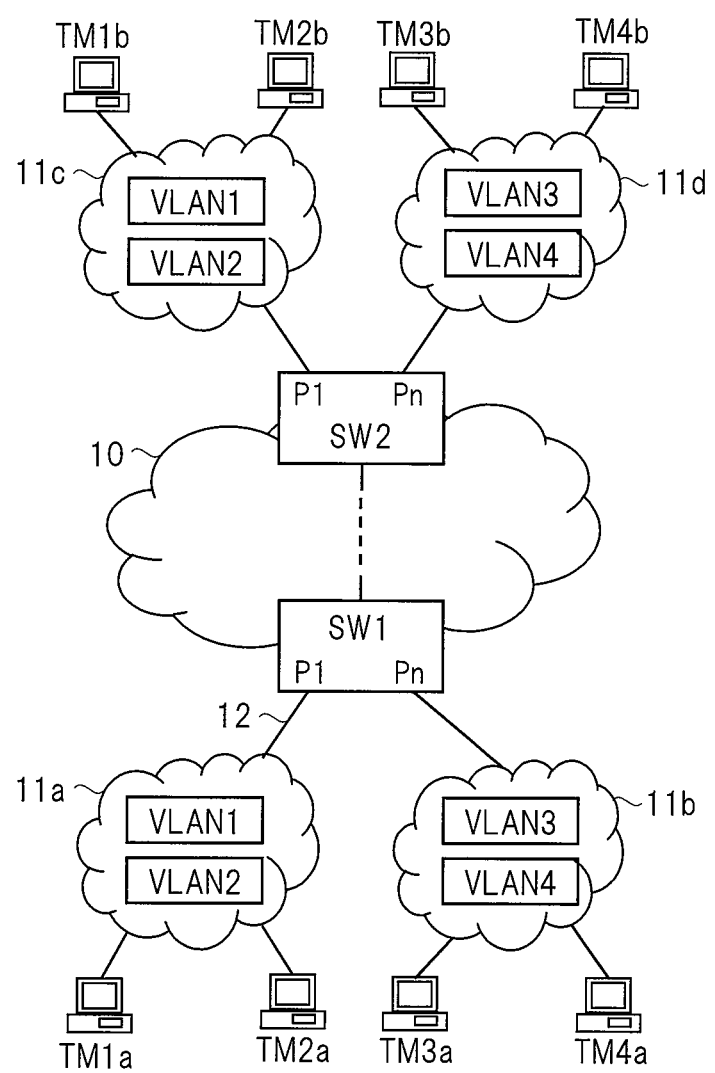
FIG. 1 is a schematic diagram illustrating a configuration example of a network system according to a first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted in principle.

First Embodiment

<<Schematic Configuration of Network System>>

FIG. 1 is a schematic diagram illustrating a configuration example of a network system according to the first embodiment of the present invention. The network system illustrated in FIG. 1 includes, for example, a plurality of customer networks 11a to 11d and a core network 10 that handles relaying between the plurality of customer networks 11a to 11d. The customer networks 11a to 11d are configured of switch apparatuses, communication lines to connect the switch apparatuses and others as appropriate. Also, information terminals TM1a and TM2a are connected to the customer network 11a and information terminals TM3a and TM4a are connected to the customer network 11b. Information terminals TM1b and TM2b are connected to the customer network 11c and information terminals TM3b and TM4b are connected to the customer network 11d.

Each of the customer networks 11a and 11c relays a frame of a VLAN (Virtual LAN) identifier "VLAN1" and a frame of a VLAN identifier "VLAN2", and each of the customer networks 11b and 11d relays a frame of a VLAN identifier "VLAN3" and a frame of a VLAN identifier "VLAN4". The information terminals TM1a and TM1b are customer terminals to which "VLAN1" is assigned, and the information terminals TM2a and TM2b are customer terminals to which "VLAN2" is assigned. Similarly, the information terminals TM3a and TM3b are customer terminals to which "VLAN3" is assigned, and the information terminals TM4a and TM4b are customer terminals to which "VLAN4" is assigned.

The core network 10 includes switch apparatuses SW1 and SW2. Each of the switch apparatuses SW1 and SW2 is, for example, an L2 (Layer 2) switch that performs a relay processing of the L2 or an L3 (Layer 3) switch that performs a relay processing of the L3 of OSI reference model. This specification describes an example in which the switch apparatus is the L2 switch. The switch apparatuses SW1 and SW2 are connected as appropriate via a communication line and a switch apparatus (not illustrated) in the core network 10.

Each of the switch apparatuses SW1 and SW2 includes a plurality of ports P1 to Pn. In this example, the ports P1 and Pn of the switch apparatus SW1 are respectively connected to the customer networks 11a and 11b via communication lines (for example Ethernet lines) 12. The ports P1 and Pn of the switch apparatus SW2 are respectively connected to the customer networks 11c and 11d via the communication lines 12.

In this configuration, for example, the switch apparatus SW1 receives the "VLAN1" frame from the information terminal TM1a at the port P1 and relays the frame toward the information terminal TM1b, and further receives the "VLAN2" frame from the information terminal TM2a at the same port P1 and relays the frame toward the information terminal TM2b. At this time, for example, when a microburst occurs in the frame from the information terminal TM1a, the microburst may affect the frame from the information terminal TM2a. Therefore, it is desired that the switch apparatus SW1 detects the occurrence of the microburst.

<<Schematic Operation [1] of Switch Apparatus (Network Apparatus)>>

Figure 2:
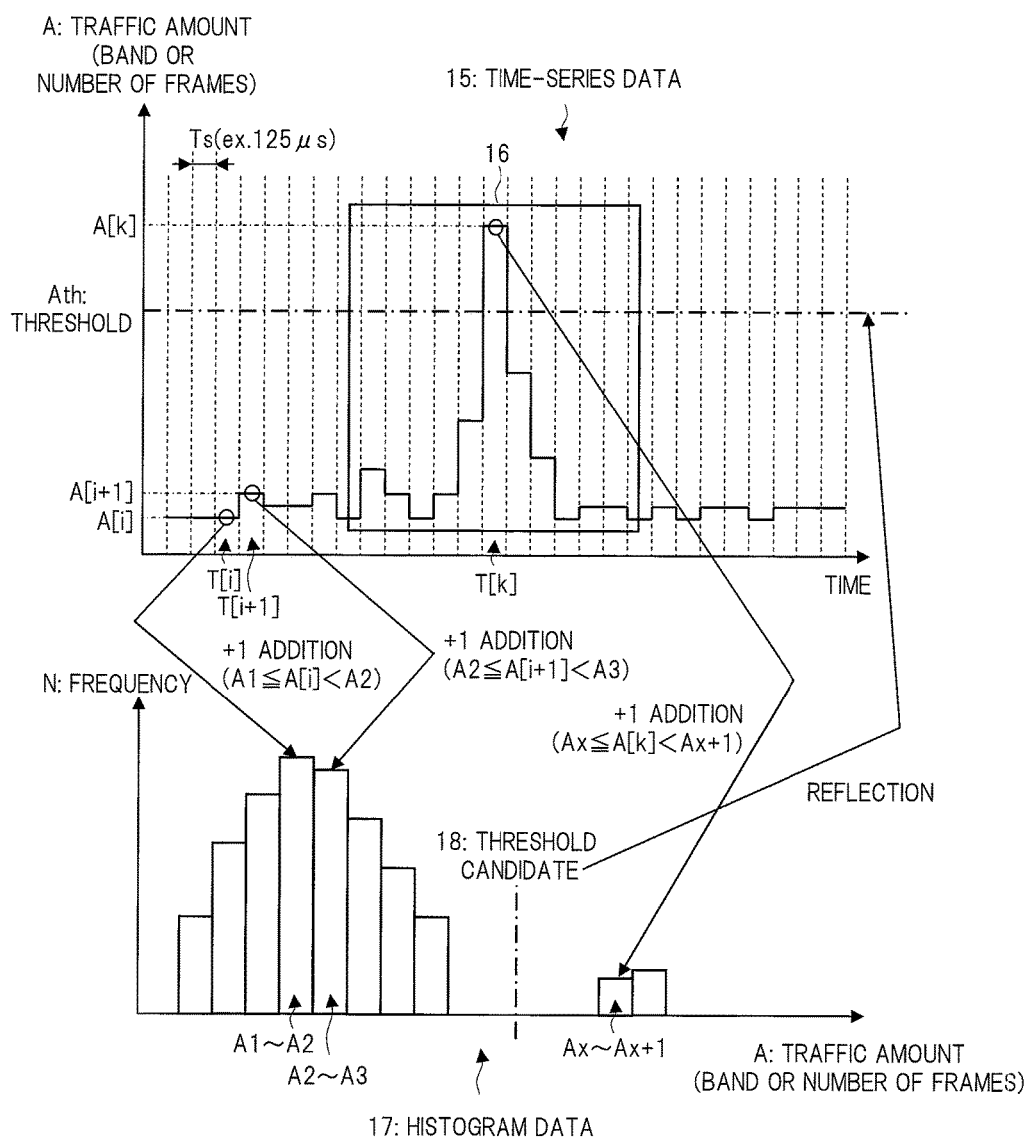
FIG. 2 is an explanatory diagram illustrating a schematic operation example of a switch apparatus in the network system in FIG. 1.

FIG. 2 is an explanatory diagram illustrating a schematic operation example of the switch apparatus in the network system in FIG. 1. Though not particularly limited, the operation in FIG. 2 is performed by the switch apparatuses (network apparatuses) SW1 and SW2 in FIG. 1. Here, the switch apparatus SW1 will be described as a representative example. As illustrated in FIG. 2, the switch apparatus SW1 has a function of obtaining time-series data 15 of a traffic amount A and detects the occurrence of the microburst by using this function.

To be specific, the switch apparatus SW1 measures the traffic amount A of frames received in each of cycles Ts. At this time, for example, the switch apparatus SW1 determines the "VLAN1" frame or the like as a frame to be measured. In the example in FIG. 2, the switch apparatus SW1 measures the traffic amount A of the frames to be measured in a cycle T[i] and obtains a traffic amount A[i] as a measurement result. Similarly, the switch apparatus SW1 measures the traffic amount A of the frames to be measured in a cycle T[i+1] subsequent to the cycle T[i] and obtains a traffic amount A[i+1] as a measurement result.

The cycle Ts has a length suitable for detecting the occurrence of the microburst, and though not necessarily limited, the length is tens to hundreds of µs (in this example, 125 µs). The traffic amount A is, for example, the band of the frame, the number of frames, or both of them. Also, the switch apparatus SW1 includes a memory region corresponding to q (for example, q=256) cycles Ts and sequentially stores the measurement result (that is, the traffic amount A) obtained for each cycle Ts to the memory region.

Here, in the example in FIG. 2, the switch apparatus SW1 obtains a traffic amount A[k] as a measurement result for a cycle T[k]. The switch apparatus SW1 compares the traffic amount A[k] and a predetermined threshold Ath, and since the traffic amount A[k] exceeds the threshold Ath, the switch apparatus SW1 determines that a microburst has occurred in the cycle T[k]. In this case, the switch apparatus SW1 outputs a burst detection signal and saves the traffic amount A of a window 16 including a plurality of cycles located before and after the cycle T[k] to another memory region. In this manner, a network administrator or the like can grasp a situation of the occurrence of the microburst in detail, for example, about how and how long the microburst has occurred, by referring to the data of the window 16.

<<Problem of Switch Apparatus (Network Apparatus)>>

It is possible to grasp the situation of the occurrence of the microburst by the use of the time-series data 15 illustrated in FIG. 2. However, the microburst originally means a sudden increase of the traffic amount A, and it is not easy to determine whether the situation detected by the time-series data 15 exactly corresponds to the microburst. In other words, it is not easy to determine whether the threshold Ath is appropriate.

As an example of a method of determining the threshold Ath, when a physical band of the port P1 of the switch apparatus SW1 is 1 Gbps, a method in which a network administrator or the like uniformly sets the threshold Ath to 500 Mbps in consideration of the physical band and the number of customers is conceivable. Here, it is presupposed that a customer for "VLAN1" is mainly using communication of streaming data and steadily consumes hundreds of Mbps band and a customer for "VLAN2" is mainly accessing the Web and steadily consumes only several Mbps band.

In light of this fact, regarding the traffic amount instantaneously exceeding 500 Mbps as a microburst is possibly adequate or an under spec for the customer for "VLAN2" and an over spec for the customer for "VLAN1". However, the actual condition of communication of each customer (that is, traffic tendency) is currently almost a black box, and thus the determination of whether the threshold Ath is appropriate itself is difficult. As a result, there is a possibility that the network is operated in a state far from the actual condition.

<<Schematic Operation [2] of Switch Apparatus (Network Apparatus)>>

Accordingly, as illustrated in FIG. 2, the switch apparatus SW1 has a function of obtaining histogram data 17 of the traffic amount A. To be specific, the switch apparatus SW1 includes a plurality of frequency counters which are provided to correspond to a plurality of ranges and each retain a frequency N for each of the ranges. Then, the switch apparatus SW1 determines in which of the ranges the traffic amount A obtained for each cycle Ts is included, and updates the frequency N of the frequency counter corresponding to the range obtained by the determination result.

In the example in FIG. 2, the switch apparatus SW1 determines that the traffic amount A[i] obtained in the cycle T[i] is included in a range "A1-A2", and updates the frequency N of the frequency counter corresponding to the range (for example, adds +1). Similarly, the switch apparatus SW1 determines that the traffic amount A[i+1] obtained in the next cycle T[i+1] is included in a range "A2-A3", and updates the frequency N of the frequency counter corresponding to the range. Thereafter, the switch apparatus SW1 determines that the traffic amount A[k] obtained in the cycle T[k] is included in a range "Ax-Ax+1", and updates the frequency N of the frequency counter corresponding to the range in the same manner.

As described above, by providing the function of obtaining the histogram data 17, the traffic tendency of each customer can be visualized. In other words, a network administrator or the like can grasp an actual condition of the communication (traffic tendency) for each customer by referring to the histogram data 17. For example, it can be assumed that a distribution is biased to relatively large ranges for a customer who mainly uses communication of streaming data and a distribution is biased to relatively small ranges for a customer who mainly accesses the Web.

Accordingly, as illustrated in the example in FIG. 2, the network administrator or the like can set a threshold candidate 18 for each customer at a place where it is possible to clearly determine whether deviation from distribution bias has occurred, and can reflect the threshold candidate 18 on the threshold Ath for determining the occurrence of the microburst. As a result, for example, the threshold Ath can be optimized for each customer and the network can be operated in a manner adapted to the actual condition. Moreover, the network administrator or the like can revise a network configuration (for example, relationship between port and customer) by using the histogram data 17 so that the band of each port is equalized to make effective use of the band. As represented by the use mentioned above, it is possible to offer beneficial information to the network administrator or the like by providing the function of obtaining the histogram data 17.

<<Configuration of Switch Apparatus (Network Apparatus)>>

Figure 3:
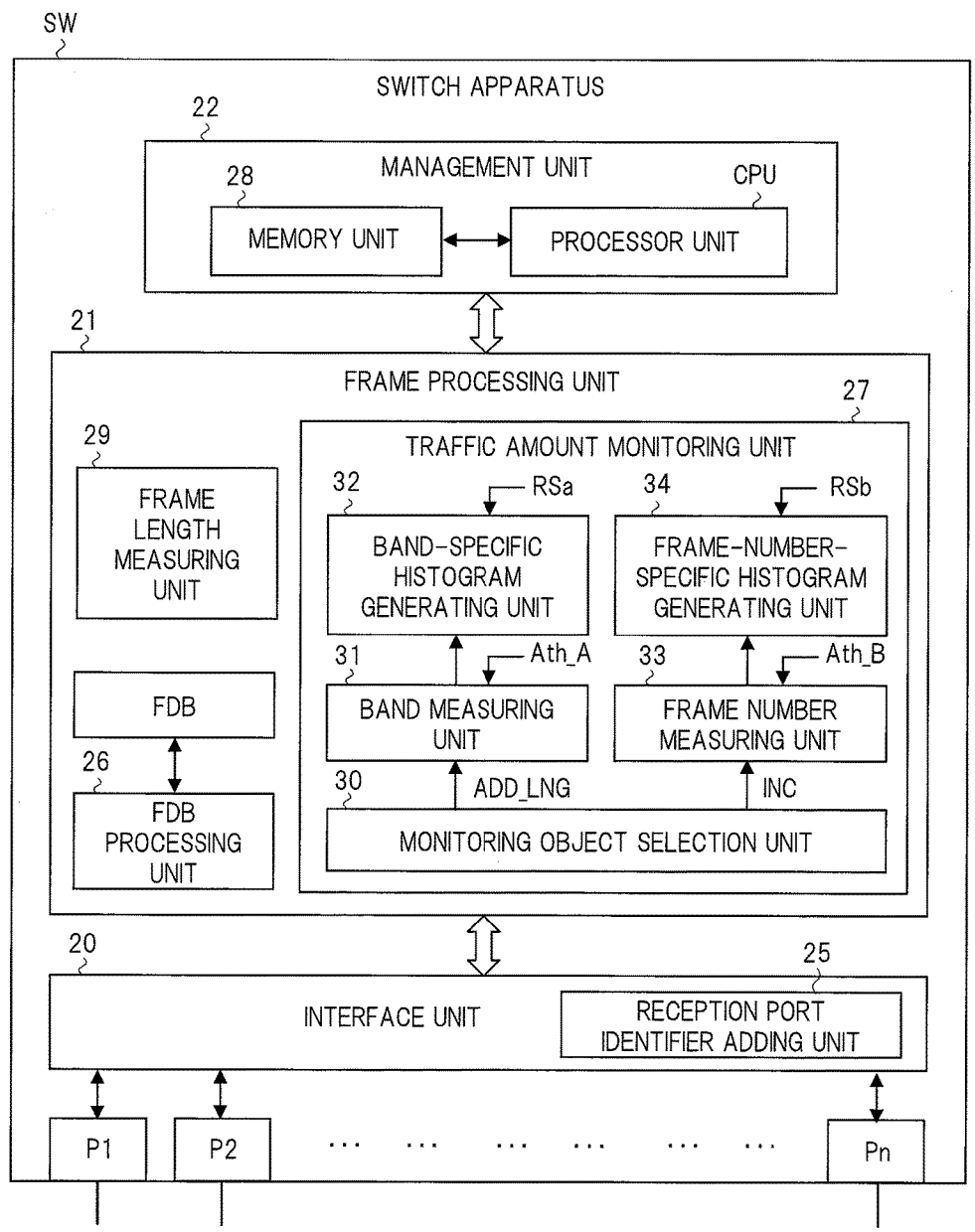
FIG. 3 is a schematic diagram illustrating a configuration example of the switch apparatus in the network system in FIG. 1.

FIG. 3 is a schematic diagram illustrating a configuration example of the switch apparatus in the network system in FIG. 1. The switch apparatus SW illustrated in FIG. 3 includes a plurality of (in this case, n) ports P1, P2, . . . , and Pn that perform the communication (transmission or reception) of frames with the outside of the apparatus, an interface unit 20, a frame processing unit 21, and a management unit 22. The interface unit 20 includes a reception buffer (not illustrated) that receives a frame from the ports P1 to Pn, a transmission buffer (not illustrated) that transmits a frame to the ports P1 to Pn, and a reception port identifier adding unit 25.

When a frame is received at the ports P1 to Pn, the reception port identifier adding unit 25 adds an identifier indicating the port that has received the frame (referred to as reception port identifier) to the frame and transmits the frame to the frame processing unit 21. In addition, when the interface unit 20 receives a frame with a destination port identifier from the frame processing unit 21, the interface unit 20 transmits the frame to the port indicated by the destination port identifier.

The management unit 22 includes a processor unit CPU and a memory unit 28, and manages and controls the entire apparatus by making the processor unit CPU execute a program stored in the memory unit 28. As one of the management functions, the management unit 22 plays a role as an interface between the network administrator or the like and the switch apparatus SW attendant on an in-band management or an out-of-band management. For example, the management unit 22 reflects various kinds of setting information instructed by the network administrator or the like on the switch apparatus SW and notifies the network administrator or the like of various kinds of information retained by the switch apparatus SW.

The frame processing unit 21 includes an FDB (Forwarding DataBase), an FDB processing unit 26, a traffic amount monitoring unit 27, and a frame length measuring unit 29. The FDB retains correspondence relationship among a MAC (Media Access Control) address, a VLAN and a port. The FDB processing unit 26 performs learning and searching of the FDB when a frame is received at the port. To be specific, in the case of learning of the FDB, the FDB processing unit 26 learns a source MAC address and a VLAN identifier of the received frame to the FDB while associating them with the reception port identifier. Also, in the case of searching of the FDB, the FDB processing unit 26 searches the FDB with using a destination MAC address and a VLAN identifier of the received frame as a search key, adds the destination port identifier which is the search result to the frame, and transmits the frame to the interface unit 20.

The frame length measuring unit 29 measures the length of a received frame by using a predetermined measuring circuit and adds the measured frame length LNG to the frame. The traffic amount monitoring unit 27 includes a monitoring object selection unit 30, a band measuring unit 31, a band-specific histogram generating unit 32, a frame number measuring unit 33 and a frame-number-specific histogram generating unit 34. Although details will be described with reference to FIG. 4, the monitoring object selection unit 30 determines a frame to be measured by the band measuring unit 31 and the frame number measuring unit 33, and when the frame to be measured is detected, the monitoring object selection unit 30 transmits a band addition signal ADD_LNG to the band measuring unit 31 and transmits an increment signal INC to the frame number measuring unit 33.

The band measuring unit (traffic amount measuring unit) 31 generates the time-series data 15 of the band illustrated in FIG. 2 on the basis of the band addition signal ADD_LNG from the monitoring object selection unit 30. Also, the band measuring unit 31 detects the occurrence of the microburst on the basis of a threshold Ath_A of the band. The frame number measuring unit (traffic amount measuring unit) 33 generates the time-series data 15 of the number of frames illustrated in FIG. 2 on the basis of the increment signal INC from the monitoring object selection unit 30. Also, the frame number measuring unit 33 detects the occurrence of the microburst on the basis of a threshold Ath_B of the number of frames.

The band-specific histogram generating unit 32 generates the histogram data 17 of the band illustrated in FIG. 2 on the basis of a measurement result of the band measuring unit 31 and a range setting value RSa of the band. The frame-number-specific histogram generating unit 34 generates the histogram data 17 of the number of frames illustrated in FIG. 2 on the basis of a measurement result of the frame number measuring unit 33 and a range setting value RSb of the number of frames.

Note that the interface unit 20 is constituted of, for example, an ASIC (Application Specific Integrated Circuit). The frame processing unit 21 is constituted by appropriately combining a CAM (Content Addressable Memory), a RAM (Random Access Memory), a ROM (Read Only Memory) and the like with a FPGA (Field Programmable Gate Array) or the ASIC. For example, the FDB is constituted of the CAM. The management unit 22 is implemented by program processing using the processor unit CPU. However, the specific mounting configuration of each part is, of course, not limited to this, and may be suitably implemented by using hardware, software, or a combination thereof.

<<Details of Traffic Amount Monitoring Unit>>

Figure 4:
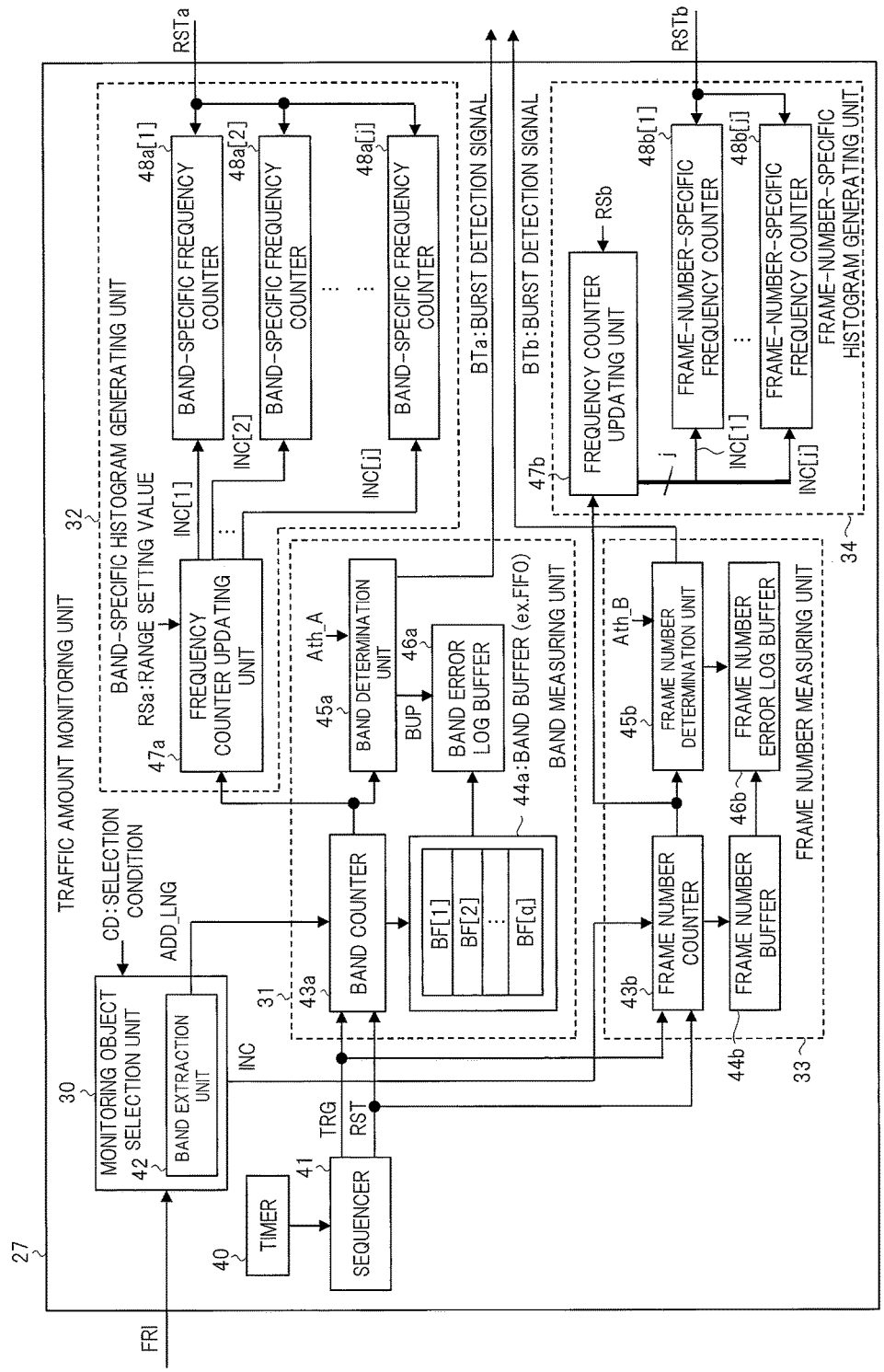
FIG. 4 is a block diagram illustrating a configuration example of a traffic amount monitoring unit in the switch apparatus in FIG. 3 in detail.
Figure 5:
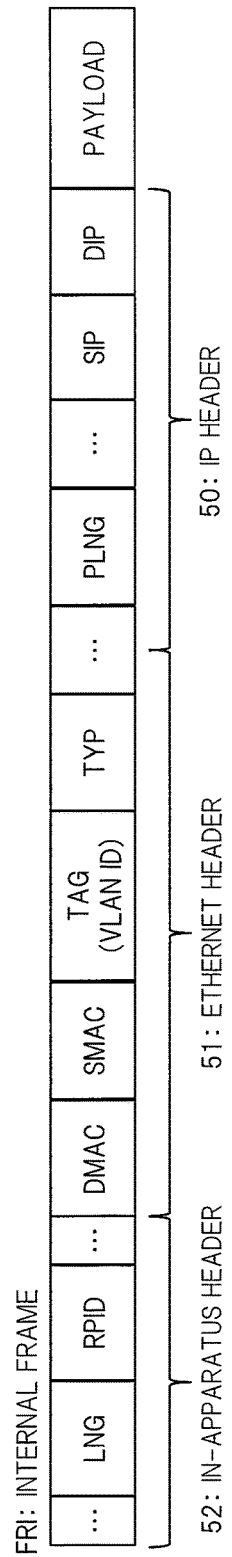
FIG. 5 is a schematic diagram illustrating a configuration example of a format of an internal frame in the switch apparatus in FIG. 3.

FIG. 4 is a block diagram illustrating a configuration example of the traffic amount monitoring unit in the switch apparatus in FIG. 3 in detail. FIG. 5 is a schematic diagram illustrating a configuration example of a format of an internal frame in the switch apparatus in FIG. 3. The traffic amount monitoring unit 27 illustrated in FIG. 4 includes a timer 40 and a sequencer 41 in addition to the respective units illustrated in FIG. 3. The timer 40 counts the cycle Ts (for example, 125 μs) illustrated in FIG. 2. The sequencer 41 outputs a trigger signal TRG and a reset signal RST in order every time when the timer 40 times up.

The monitoring object selection unit 30 operates by receiving, for example, an internal frame FRI from the interface unit 20 illustrated in FIG. 5. For example, the internal frame FRI in FIG. 5 has a configuration in which an in-apparatus header 52 is added to a received frame. The received frame contains, for example, a payload, an IP header 50 and an Ethernet header 51. The IP header 50 contains a destination IP address DIP, a source IP address SIP, and a packet length (in octets) PLNG. The Ethernet header 51 contains a source MAC address SMAC, a destination MAC address DMAC, a tag region TAG, and a type TYP. The tag region TAG contains the VLAN identifier (VLAN ID). The in-apparatus header 52 contains the reception port identifier RPID and the frame length LNG measured by the frame length measuring unit 29.

The monitoring object selection unit 30 receives the internal frame FRI, detects a frame that matches a selection condition CD set in advance, and determines the detected frame as an object to be measured by the traffic amount measuring unit (the band measuring unit 31 and the frame number measuring unit 33). The selection condition CD is instructed from, for example, the network administrator or the like via the management unit 22. Although not necessarily limited, the specific selection condition CD is the reception port identifier RPID, the VLAN identifier, or a combination thereof.

For example, when the selection condition CD is the VLAN identifier, the monitoring object selection unit 30 determines the frame (internal frame FRI) containing the VLAN identifier value as an object to be measured. Also, when the selection condition CD is the reception port identifier RPID and the VLAN identifier, the monitoring object selection unit 30 determines the internal frame FRI that includes both values of the reception port identifier RPID and the VLAN identifier as an object to be measured.

The monitoring object selection unit 30 outputs the increment signal INC to the frame number measuring unit 33 every time when the monitoring object selection unit 30 detects the frame to be measured. Also, the monitoring object selection unit 30 includes a band extraction unit 42. The band extraction unit 42 extracts the frame length LNG in the in-apparatus header 52 in FIG. 5 or the packet length PLNG in the IP header 50 from the internal frame FRI to be measured and transmits the band addition signal ADD_LNG containing the extracted value (that is, band) to the band measuring unit 31.

The band measuring unit (traffic amount measuring unit) 31 includes a band counter 43a, a band buffer 44a, a band determination unit 45a, and a band error log buffer 46a. The band counter 43a sequentially adds a band contained in the band addition signal ADD_LNG. Also, the band counter 43a outputs a count value (addition result) in accordance with the trigger signal TRG from the sequencer 41, and resets a counter value in accordance with the reset signal RST from the sequencer 41. As a result, the band counter 43a measures the band (traffic amount) of the frame received within the cycle for each cycle Ts, and outputs the measured band for each cycle.

The band buffer 44a is constituted of, for example, a FIFO (First In First Out) memory, and sequentially stores the count value output from the band counter 43a. The band buffer 44a includes, for example, buffer regions BF[1] to BF[q] of "bit width of the band counter 43a×q". The value of q is not particularly limited, but is 256 or the like. In this case, the band buffer 44a can retain the count value (band) corresponding to 256 cycles in the time-series data 15 in FIG. 2.

The band determination unit (traffic amount determination unit) 45a compares the band (traffic amount) output from the band counter 43a for each cycle and the threshold Ath_A of a predetermined band, and outputs a burst detection signal BTa when the band exceeds the threshold Ath_A. For example, the threshold Ath_A is instructed from the network administrator or the like via the management unit 22. Also, the band determination unit 45a outputs a backup signal BUP when a predetermined number of cycles Ts have passed after the detection of the microburst. In response to the backup signal BUP, the band error log buffer 46a fetches the values of a plurality of predetermined buffer regions in the band buffer 44a. The fetched value corresponds to the window 16 in FIG. 2.

Note that when the management unit 22 receives the burst detection signal BTa, the management unit 22 records an error log in the memory unit 28. At this time, the management unit 22 further reads the information of the band error log buffer 46a and records the information in the memory unit 28 while associating it with the error log.

The band histogram generating unit 32 includes a frequency counter updating unit 47a and a plurality of (in this case, j) band-specific frequency counters 48a[1] to 48a[j]. The plurality of band-specific frequency counters 48a[1] to 48a[j] are provided so as to correspond to a plurality of ranges, and retain frequencies of the plurality of ranges, respectively. The frequency counter updating unit 47a determines in which of the plurality of ranges the band (traffic amount) output from the band counter 43a for each of the cycles Ts is included, and updates the frequency of the frequency counter corresponding to the range obtained by the determination result.

To be specific, a range setting value RSa indicating the plurality of ranges is set to the frequency counter updating unit 47a. The range setting value RSa can be variably set from the outside of the apparatus, and can be set by, for example, the network administrator or the like via the management unit 22. Here, the number "j" of the band-specific frequency counters is, for example, 128. In addition, though not particularly limited, the band-specific frequency counter 48a [1] retains the frequency when the band is zero, the band-specific frequency counter 48a[2] retains the frequency when the band is less than "X1", and the band-specific frequency counter 48a [j] retains the frequency when the band is equal to or more than "X2".

For example, when setting the ranges linearly, the step width of the band is automatically determined on the basis of the number of remaining band-specific frequency counters (for example, 125) by setting the values of "X1" and "X2" as the range setting value RSa, and the respective ranges of the remaining band-specific frequency counters are also automatically determined. However, of course, a method of explicitly specifying the ranges by determining the range from xxMB to yyMB by a zzMB step may be used, and a method of determining the ranges exponentially as 1 MB to 2 MB, 2 MB to 4 MB, 4 MB to 8 MB, and the like may also be used depending on conditions.

The frequency counter updating unit 47a outputs an increment signal INC[1] to the band-specific frequency counter 48a[1] on the basis of such a range setting value RSa when the band output from the band counter 43a is zero. In response to this, the band-specific frequency counter 48a[1] increments its own counter value (adds +1). Similarly, the frequency counter updating unit 47a outputs an increment signal INC[2] to the band-specific frequency counter 48a[2] when the band output from the band counter 43a is less than "X1". In response to this, the band-specific frequency counter 48a[2] increments its own counter value.

The configurations and operations of the frame number measuring unit (traffic amount measuring unit) 33 and the frame-number-specific histogram generating unit 34 are substantially the same as those of the band measuring unit 31 and the band-specific histogram generating unit 32. When briefly described while focusing on the difference, the frame number measuring unit 33 includes a frame number counter 43b, a frame number buffer 44b, a frame number determination unit 45b, and a frame number error log buffer 46b. Unlike the band counter 43a, the frame number counter 43b increments its own counter value (adds +1) in accordance with the increment signal INC from the monitoring object selection unit 30. The frame number determination unit 45b detects the occurrence of the microburst by using the threshold value Ath_B of the number of frames different from that of the band determination unit 45a, and outputs a burst detection signal BTb when the microburst is detected.

The frame-number-specific histogram generating unit 34 includes a frequency counter updating unit 47b and a plurality of (in this case, j) frame-number-specific frequency counters 48b[1] to 48b[j]. The plurality of frame-number-specific frequency counters 48b[1] to 48b[j] are provided so as to correspond to a plurality of ranges, and retain frequencies for each of the plurality of ranges, respectively. The frequency counter updating unit 47b determines in which of the plurality of ranges the number of frames (traffic amount) output from the frame number counter 43b for each of the cycles Ts is included, and updates the frequency of the frequency counter corresponding to the range obtained by the determination result. A range setting value RSb similar to the range setting value RSa is input to the frequency counter updating unit 47b.

In this case, in order to reliably execute updating of the frequency counter for each cycle Ts, the band-specific histogram generating unit 32 and the frame-number-specific histogram generating unit 34 are implemented by hardware such as the FPGA or the ASIC. However, it is also possible to implement the band-specific histogram generating unit 32 and the frame-number-specific histogram generating unit 34 by program processing by the processor unit CPU of the management unit 22 in some cases. Namely, the processor unit CPU of the management unit 22 sometimes handles various processing such as the processing of complicated communication protocol in cooperation with the frame processing unit 21 in addition to the management of the apparatus, and the processing load thereof may become heavy steadily. In such a case, it is desirable to use hardware like in the first embodiment, but if the processing capacity of the processor unit CPU is high and has sufficient margin in the processing load, it is also possible to use software.

In addition, the band-specific frequency counters 48a[1] to 48a[j] and the frame-number-specific frequency counters 48b[1] to 48b[j] need to perform the counting operation for a relatively long time for obtaining the histogram. Therefore, if implemented by hardware, there is a concern that overflow may occur in each frequency counter. Accordingly, in such a case, it is beneficial to use the processor unit CPU of the management unit 22.

To be specific, the processor unit CPU executes a predetermined program periodically or in response to a request from the network administrator or the like. On the basis of the predetermined program, the processor unit CPU reads and backs up the band-specific frequency counters 48a[1] to 48a[j] and the frame-number-specific frequency counters 48b[1] to 48b[j] in the memory unit 28, resets the band-specific frequency counter with a reset signal RSTa, and resets the frame-number-specific frequency counter with a reset signal RSTb. Then, the processor unit CPU accumulates the frequency for each frequency counter on the memory unit 28 every time when the backup is performed, thereby managing the frequency of each frequency counter in the long term.

As described above, it is possible to visualize the traffic tendency by using the network apparatus (switch apparatus) of the first embodiment.

Second Embodiment

<<Configuration of Network Apparatus (Modified Example)>>

Figure 6A:
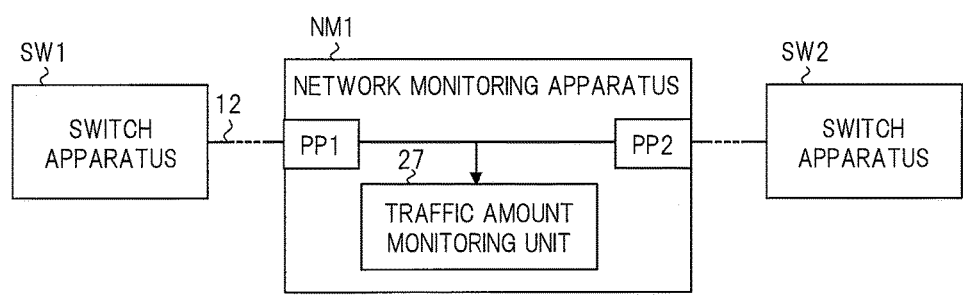
FIG. 6A is a schematic diagram illustrating an example of a mounting configuration different from FIG. 3 in a network apparatus according to a second embodiment of the present invention.
Figure 6B:
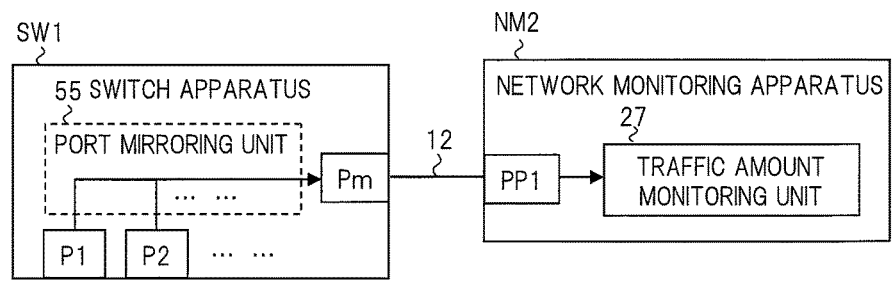
FIG. 6B is a schematic diagram illustrating an example of a mounting configuration different from FIG. 3 in the network apparatus according to the second embodiment of the present invention.

FIG. 6A and FIG. 6B are schematic diagrams each illustrating one example of a mounting configuration different from FIG. 3 in the network apparatus according to the second embodiment of the present invention. The traffic amount monitoring unit 27 illustrated in FIG. 4 is not limited to that provided in the switch apparatus SW like in the case of FIG. 3, but may be provided as a single unit. For example, a network monitoring apparatus (network apparatus) NM1 in FIG. 6A includes ports PP1 and PP2 and the traffic amount monitoring unit 27 similar to that of FIG. 4, and is installed in the form being inserted in the communication lines 12 in the core network 10 in FIG. 1. The network monitoring apparatus NM1 relays the frame received at one of the ports PP1 and PP2 to the other as it is and monitors the traffic amount of the frames in the same manner as the case of FIG. 4.

On the other hand, a network monitoring apparatus (network apparatus) NM2 in FIG. 6B includes a port PP1 and the traffic amount monitoring unit 27 similar to that of FIG. 4, and is installed in the form being connected to the switch apparatus SW1 or the like in FIG. 1. The switch apparatus SW1 may include a port mirroring unit 55 that copies a frame received at a predetermined port (in this case, a plurality of ports P1, P2, . . . ) and transmits the copied frame to a predetermined port (in this case, port Pm). The network monitoring apparatus NM2 receives the frame transmitted from the port Pm of the switch apparatus SW1 at the port PP1 and monitors the traffic amount of the frames in the same manner as the case of FIG. 4.

As described above, the effect similar to that of the case of the first embodiment can be obtained also by using the network apparatus of the second embodiment. However, since it is necessary to separately add a new apparatus to the network in this case, it is more preferable to use the network apparatus of the first embodiment from this point of view.

In the foregoing, the invention made by the inventors of the present invention has been concretely described based on the embodiments. However, the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, in the above-described embodiment, the traffic amount monitoring unit 27 in FIG. 3 includes two sets of measurement systems (that is, a band measurement system (the band measuring unit 31 and the band-specific histogram generating unit 32) and a frame number measurement system (the frame number measuring unit 33 and the frame-number-specific histogram generating unit 34)), but the configuration including only one of them is also possible. However, in order to grasp the traffic tendency in further detail, for example, the relationship between the number of frames and the band, it is desirable to provide the two sets of measurement systems.

What is claimed is:

1. A network apparatus comprising:
    a port that receives a frame;
    a traffic amount measuring circuitry that measures a traffic amount of the frames received in each of cycles and outputs the measured traffic amount for each of the cycles;
    a plurality of frequency counters that are provided so as to correspond to a plurality of ranges and retain frequencies of the plurality of ranges respectively; and
    a frequency counter updating circuitry that determines in which of the plurality of ranges the traffic amount output for each of the cycles is included, and updates the frequency of the frequency counter corresponding to the range obtained by the determination result.

2. The network apparatus according to claim 1 further comprising:
    a measurement object selection circuitry that detects the frame that matches a predetermined selection condition and determines the detected frame as an object to be measured by the traffic amount measuring circuitry.

3. The network apparatus according to claim 2,
    wherein the traffic amount is a band of the frame or the number of the frames.

4. The network apparatus according to claim 2,
    wherein the traffic amount is a band of the frame and the number of the frames, and
    the network apparatus includes two sets of the traffic amount measuring circuitry, the plurality of frequency counters, and the frequency counter updating circuitry.

5. The network apparatus according to claim 2, further comprising:
    a traffic amount determination circuitry that compares the traffic amount output for each of the cycles and a predetermined threshold and outputs a burst detection signal when the traffic amount exceeds the predetermined threshold.

6. The network apparatus according to claim 2, further comprising:
    a memory; and
    a processor that reads and backs up the plurality of frequency counters to the memory and resets the plurality of frequency counters on the basis of a predetermined program.

7. The network apparatus according to claim 1,
    wherein the plurality of ranges can be variably set from outside of the apparatus.

* * * * *